(12) United States Patent
Middelberg et al.

(10) Patent No.: US 11,002,841 B2
(45) Date of Patent: May 11, 2021

(54) METHOD FOR THE SIGNAL EVALUATION OF SIGNALS OF A RANGEFINDER

(71) Applicant: CLAAS Selbstfahrende Erntemaschinen GmbH, Harsewinkel (DE)

(72) Inventors: René Middelberg, Osnabrueck (DE); Sven Carsten Belau, Guetersloh (DE); Daniel Irmer, Herzebrock-Clarholz (DE); Sebastian Spiekermann, Ostbevern (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 16/999,180

(22) Filed: Aug. 21, 2020

(65) Prior Publication Data

US 2021/0063547 A1 Mar. 4, 2021

(30) Foreign Application Priority Data

Aug. 29, 2019 (DE) ...................... 10 2019 123 207.4

(51) Int. Cl.
*B60Q 1/00* (2006.01)
*G01S 7/497* (2006.01)
(Continued)

(52) U.S. Cl.
CPC ............ *G01S 7/497* (2013.01); *A01B 69/008* (2013.01); *A01B 71/08* (2013.01); *B60Q 9/00* (2013.01);
(Continued)

(58) Field of Classification Search
CPC ................... G01S 7/497; G01S 17/931; G01S 2007/4975; G01S 17/42; G01S 17/88;
(Continued)

(56) References Cited

U.S. PATENT DOCUMENTS

| 6,389,785 B1 * | 5/2002 | Diekhans .............. A01B 69/001 56/10.2 F |
| 6,611,227 B1 | 8/2003 | Nebiyeloul-Kifle et al. |

(Continued)

FOREIGN PATENT DOCUMENTS

| DE | 202012105044 U1 | 3/2015 |
| EP | 1302784 A2 | 4/2003 |
| EP | 3300561 A1 | 4/2018 |

OTHER PUBLICATIONS

European Search Report dated Nov. 18, 2020 issued in the corresponding European Application Serial No. EP 20 17 7564 (with English translation of relevant parts).

*Primary Examiner* — Phung Nguyen
(74) *Attorney, Agent, or Firm* — Collard & Roe, P.C.

(57) ABSTRACT

A method for the evaluation of signals of a rangefinder having at least one sensor point involves carrying out measurements cyclically, wherein the rangefinder emits a plurality of measurement points that indicate a distance from the sensor point. The rangefinder measures distances in a plurality of directions, and a horizontal angle is associated with each measurement point. The measurement points are differentiated into useful signals and interfering signals based on the distance. Measurement points with a distance below a first limiting value are identified as interfering signals, and measurement points above the first limiting value are identified as useful signals. Useful signals are associated with a first measurement area when they satisfy a predetermined condition for distance and horizontal angle. The quantity of useful signals in the first measurement area is determined, and a warning signal is emitted when the quantity of useful signals lies below a first threshold value.

20 Claims, 6 Drawing Sheets

(51) Int. Cl.
*G01S 17/931* (2020.01)
*A01B 69/04* (2006.01)
*A01B 71/08* (2006.01)
*B60Q 9/00* (2006.01)
*G08B 21/18* (2006.01)
*A01D 41/02* (2006.01)
*A01D 41/12* (2006.01)
*A01D 41/127* (2006.01)

(52) U.S. Cl.
CPC .......... *G01S 17/931* (2020.01); *G08B 21/182* (2013.01); *A01D 41/02* (2013.01); *A01D 41/127* (2013.01); *A01D 41/1252* (2013.01); *G01S 2007/4975* (2013.01)

(58) Field of Classification Search
CPC ........... G01S 2007/4977; G01S 7/4817; G01S 2007/4043; G01S 2007/52011; A01B 69/008; A01B 71/08; B60Q 9/00; G08B 21/182; A01D 41/02; A01D 41/1252; A01D 41/127
See application file for complete search history.

(56) References Cited

U.S. PATENT DOCUMENTS

| | | | |
|---|---|---|---|
| 7,064,810 B2 * | 6/2006 | Anderson | G01S 7/4814 356/5.01 |
| 2018/0284268 A1 * | 10/2018 | McWhirter | G01S 17/89 |
| 2018/0342113 A1 * | 11/2018 | Kislovskiy | G08G 1/202 |
| 2020/0213581 A1 * | 7/2020 | Lu | G06T 7/0004 |

* cited by examiner

METHOD FOR THE SIGNAL EVALUATION OF SIGNALS OF A RANGEFINDER

CROSS-REFERENCE TO RELATED APPLICATIONS

This application claims priority under 35 USC 119 of German Application No. DE 10 2019 123 207.4, filed on Aug. 29, 2019, the disclosure of which is herein incorporated by reference.

BACKGROUND OF THE INVENTION

The present invention is directed to a method for the evaluation of signals of a rangefinder.

The rangefinder is preferably a laser rangefinder. Laser rangefinders are also known as Lidar systems. Laser rangefinders measure the distance of measurement points from a sensor point of the laser rangefinder. Laser rangefinders which scan a two-dimensional or three-dimensional space are also known as laser scanners.

A self-propelled harvesting machine with a laser scanner is known from EP3300561A1. The laser scanner serves to detect a driving lane for the self-propelled harvesting machine.

SUMMARY OF THE INVENTION

It is the object of the invention to improve the evaluation of signals of a rangefinder.

According to the invention, this object is met by a method for the evaluation of signals of a rangefinder, particularly of a laser rangefinder, wherein the rangefinder has at least one sensor point, wherein the rangefinder carries out measurements cyclically, wherein the rangefinder emits a plurality of measurement points for each measurement, wherein each measurement point indicates a distance from the sensor point, wherein the rangefinder measures distances in a plurality of directions, and a horizontal angle is associated with each measurement point, wherein a plurality of measurement points are differentiated into useful signals and interfering signals based on the distance, wherein measurement points with a distance below a first limiting value are identified as interfering signals, and measurement points above the first limiting value are identified as useful signals, wherein useful signals are associated with a first measurement area when the useful signals satisfy a predetermined condition for distance and horizontal angle, wherein the quantity of useful signals in the first measurement area is determined and compared with a first threshold value, wherein a warning signal is emitted when the quantity of useful signals lies below the first threshold value.

Dividing measurement points into useful signals and interfering signals by distance is a particularly simple way of dividing. Dividing by distance is particularly useful when the distance of the objects to be mapped is approximately known. An example is a self-propelled agricultural machine such as a combine harvester, a forage harvester or a tractor which uses a rangefinder to detect objects in driving direction. If the rangefinder is arranged on top of the agricultural machine and measures forward and downward, it is assumed that there is no object within the first meters that is to be mapped. The useful signals can be fed to an application for further processing. The warning signal can alert the user or the application to impairment of the signal quality. The user or the application can react to this and possibly introduce measures to improve the signal quality. If necessary, the interfering signals can be used to select suitable measures for improving the signal quality.

Alternatively, a method for the evaluation of signals of a rangefinder, particularly of a laser rangefinder, is suggested, wherein the rangefinder carries out measurements cyclically, wherein the rangefinder emits a plurality of measurement points for each measurement, wherein each measurement point indicates a distance, wherein the rangefinder measures distances in a plurality of directions and a horizontal angle is associated with each measurement point. A plurality of measurement points are differentiated into useful signals and interfering signals based on the distance, wherein measurement points with a distance below a first limiting value are identified as interfering signals, and measurement points above the first limiting value are identified as useful signals, wherein the quantity of interfering signals is determined and a warning signal is emitted when the quantity of interfering signals meets a predetermined condition.

Further, the invention is directed to a system for signal evaluation with a rangefinder and a computing unit, wherein the rangefinder is communicatively coupled with the computing unit, wherein the computing unit is provided and configured to implement a method according to the invention. The signals of the rangefinder are transmitted to the computing unit and differentiated by the computing unit into useful signals and interfering signals.

The rangefinder is preferably attached to a self-propelled agricultural work machine. Dust and dirt often result when a self-propelled agricultural work machine is working in a field and impair the signal quality of the rangefinder. Therefore, the use of a method according to the invention is particularly advantageous in this instance.

The first limiting value is preferably less than six meters. When the rangefinder is arranged on the roof of a self-propelled agricultural work machine, objects to be mapped are to be expected beyond six meters.

Further, the first limiting value is preferably greater than three meters. When the rangefinder is arranged at a self-propelled agricultural work machine, no objects to be mapped are to be expected below three meters.

Interfering signals are preferably differentiated into dust signals and dirt signals. Interfering signals with a distance below a second limiting value are identified as dirt signals. Interfering signals above the second limiting value are identified as dust signals. Differentiating between dust signals and dirt signals by distance makes it possible to differentiate the cause of the interfering signals. Rangefinders are typically installed behind a cover for protection. The cover protects the rangefinder from damage. In the case of a laser rangefinder, the cover is typically a transparent plate.

Rangefinders work by emitting measurement signals and receiving the reflected measurement signals. The distance is determined from the transit time of the measurement signals. Dirt signals result through reflection of the measurement signals on dirt which has accumulated on the cover. Dust signals result through reflection of the measurement signals on dust particles which are located between the cover and the object to be mapped.

The second limiting value is preferably greater than the distance between the sensor point and the cover, since the measurement signal can be reflected multiple times after it is reflected on the dirt before being absorbed by the sensor. The second limiting value is preferably greater than thirty centimeters.

The second limiting value is preferably less than one meter. Above one meter, it is assumed that the signals do not result from reflection on dirt.

Useful signals above a third limiting value are preferably disregarded when determining the quantity of useful signals. Measurement points with very large distances are typically not directly reflected by the objects to be mapped but rather result from multiple reflection or unusual external conditions. Therefore, these measurement points are not considered to be useful signals and are disregarded.

The third limiting value is preferably greater than fourteen meters. Meaningful useful signals are to be assumed below fourteen meters.

The third limiting value is preferably less than twenty meters. No meaningful useful signal is to be expected above twenty meters. When rangefinders are used in agricultural machines, the range above twenty meters is typically not relevant for the application in which the useful signals are processed.

The useful signals are preferably associated with a plurality of measurement areas, wherein the association of the useful signals with measurement areas takes into account the horizontal angle and the distance of the useful signals. Many applications can be executed more efficiently by dividing the useful signals into measurement areas because the applications need only take into account the useful signals from relevant measurement areas. In this way, the amount of data to be processed is reduced and the execution of the application is more efficient.

A vertical angle is preferably associated with each measurement point, and the association of the useful signals with the measurement areas takes the vertical angle into account. With measurement points having different vertical angles, the measurement areas can also be differentiated through the vertical angle. The application can be executed more efficiently by further subdividing the measurement areas.

A position comprising distance, horizontal angle and vertical angle is preferably converted into a Cartesian coordinate system for each useful signal, the position in the Cartesian coordinate system is projected on a plane and the first measurement area is rectangular in the plane. The position of every measurement point typically takes the form of a combination of distance, horizontal angle and vertical angle, i.e., polar coordinates. For some applications, it is useful to define a measurement area as a rectangle in a plane. For this purpose, the projection of the measurement points on the plane is determined and the measurement area with which the respective measurement point is associated is determined on the basis of the projection.

A straight line defined by vertical angle, horizontal angle and sensor point is preferably calculated for a first interfering signal, and the first interfering signal is associated with the first measurement area when the straight line intersects the plane. By associating the interfering signals whose straight line intersects the plane within the first measurement area, the interfering signals which interfere with the measurement in the first measurement area are associated with the measurement area. Interfering signals whose straight line does not intersect the plane or intersects the plane outside of the first measurement area do not interfere with the measurement within the measurement area.

Alternatively, the interfering signals are associated with a plurality of angular areas, and the association of interfering signals with the angular areas takes into account the horizontal angle of the interfering signals. The association of dust signals with the angular areas and/or the association of the dirt signals with angular areas preferably takes into account the vertical angle. An angular area is preferably associated with every measurement area. The interfering signals are associated with angular areas analogous to the association of the useful signals with measurement areas. The interfering signals are processed more efficiently as a result of this association. The angular areas are preferably associated in each instance with the measurement area whose measurement is disrupted by the interfering signals in the angular area. The geometric shape of the measurement areas and of the angular areas can vary. Since it is not always clear which interfering signals interfere with which measurement areas, the angular areas may also contain interfering signals which do not interfere with the measurement in the associated measurement area.

When the quantity of useful signals in the first measurement area for a measurement lies below the first threshold value, the quantity of dust signals and the quantity of dirt signals of the measurement in the associated angular area are preferably compared. A signal for dust extraction is emitted when the quantity of dust signals is higher than the quantity of dirt signals, and a signal for cleaning is emitted when the quantity of dirt signals is higher than the quantity of dust signals. When the quantity of useful signals in the first measurement area falls below the first threshold value, measures for improving the signal quality should be introduced. The comparison of dust signals with dirt signals indicates whether dust extraction or dirt removal is the better step, and an appropriate signal is emitted.

In an embodiment form, a signal for dust extraction is emitted when the quantity of dust signals is higher than a second threshold value. By emitting a signal for dust extraction when the quantity of dust signals is higher than a second threshold value, i.e., even if the quantity of useful signals in the first measurement area is above the first threshold value, a measure can be introduced for improving the signal quality already before the signal quality is impaired.

In an embodiment form, a signal for cleaning is emitted when the quantity of dirt signals is higher than a second threshold value. The second threshold value is preferably less than one third of the quantity of measurement points of the measurement.

In a further embodiment form, a signal for cleaning is emitted when the quantity of dirt signals is higher than a third threshold value. The third threshold value is preferably less than one third of the quantity of measurement points of the measurement.

In a further embodiment form, a signal for dust extraction is emitted when the quantity of dust signals in an angular area is higher than a fourth threshold value. The angular area is preferably the angular area associated with the first measurement area. By restricting to the angular area, the dust signals lying in a particularly relevant range are acquired. The level of the fourth threshold value preferably depends on the size of the angular area. The fourth threshold value is preferably less than one third of the quantity of measurement signals emitted through the angular area.

In a further embodiment form, a signal for cleaning is emitted when the quantity of dirt signals in an angular area is higher than a fifth threshold value. The angular area is preferably the angular area associated with the first measurement area. By restricting to the angular area, the dirt signals lying in a particularly relevant range are acquired. The level of the fifth threshold value preferably depends on the size of the angular area. The fifth threshold value is preferably less than one third of the quantity of measurement signals emitted through the angular area.

In a preferred embodiment form, dirt signals having a distance of less than a fourth limiting value during the determination of the quantity of dirt signals are disregarded. The fourth threshold value is preferably greater than ten centimeters. Rangefinders are often encapsulated, and the measurement signals exit the enclosure through a transparent plate, some measurement signals being reflected at the plate. Accordingly, these signals occur neither because of dirt nor because of dust but as the result of reflection on the objects to be mapped. Therefore, these signals are disregarded when determining the quantity of dirt signals.

The first threshold value is preferably less than one half of the quantity of measurement points of the measurement.

In a particularly preferred manner, the first threshold value is less than one third of the quantity of measurement points of the measurement.

BRIEF DESCRIPTION OF THE DRAWINGS

The invention will be described in more detail in the following referring to drawings which are not true to scale and depict embodiment examples. The drawings show.

DETAILED DESCRIPTION OF THE EMBODIMENTS

Figure 1:
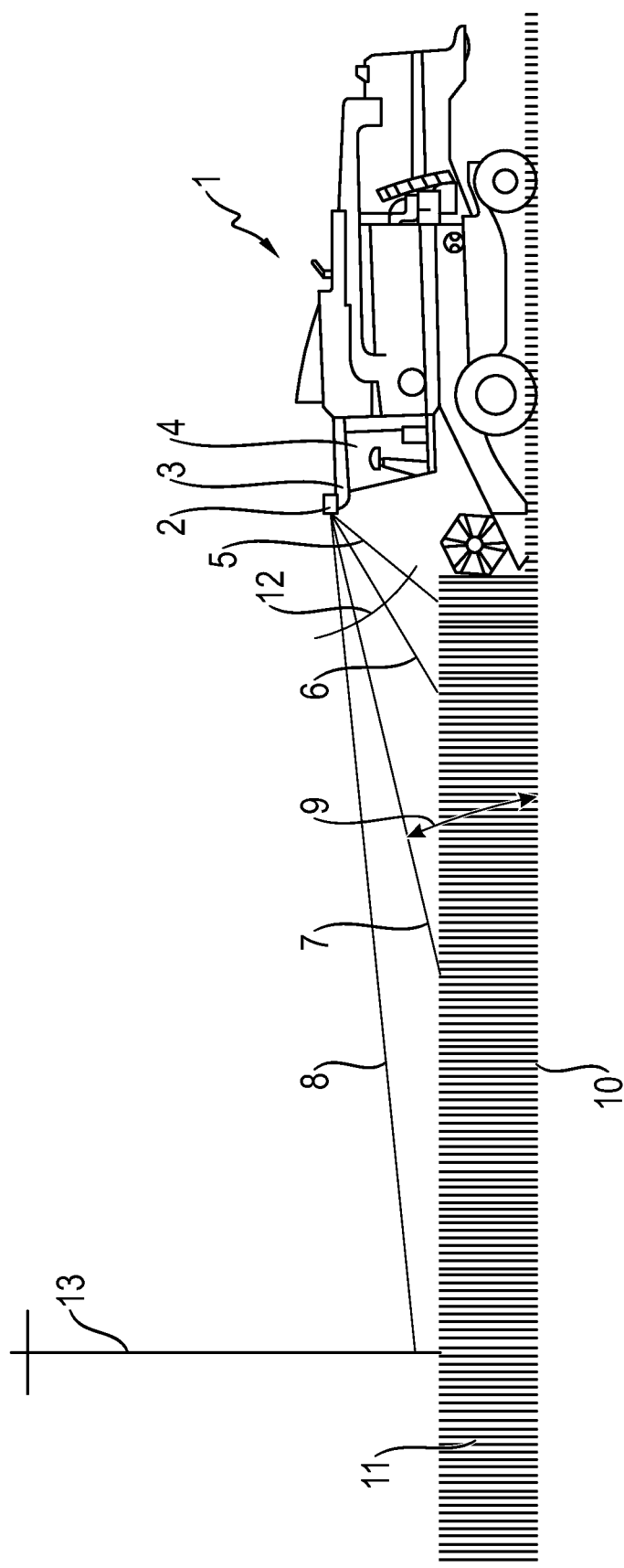
FIG. 1 a self-propelled agricultural work machine with a rangefinder in a side view.

FIG. 1 shows a self-propelled agricultural work machine 1 with a rangefinder 2. The agricultural work machine 1 in this example is a combine harvester, and the rangefinder 2 is attached to a roof 3 of the driver's cab 4. The rangefinder 2 in this example is a Lidar system. The rangefinder 2 emits measurement signals 5, 6, 7, 8 with different vertical angles 9. The measurement signals 5, 6, 7, 8 are emitted in direction of the field 10 in front of the work machine 1. Crops 11 grow in the field 10. Measurement signals 5, 6, 7, 8 whose distance is greater than a first limiting value 12 are identified as useful signals. The first measurement signal 5, the second measurement signal 6 and the third measurement signal 7 are reflected by the crop 11. The fourth measurement signal 8 is reflected by an obstacle 13. Since all of the measurement signals 5, 6, 7, 8 are reflected by objects which are to be mapped and whose distance is greater than the first limiting value 12, all of the measurement points resulting from the measurement signals are identified as useful signals. The processing of the measurement points can be carried out by a computing unit (not shown) installed at the sensor or by another computing unit which is communicatively coupled with the sensor, which sensor conveys the measurement points to the computing unit. The work machine 1 is outfitted with a dust extraction device (not shown). In particular, the amount of dust in front of the rangefinder 2 can be reduced with the dust extraction device. Further, the work machine 1 is outfitted with a cleaning system (not shown). In particular, dirt can be removed from a cover of the rangefinder 2 with the cleaning system.

Figure 2:
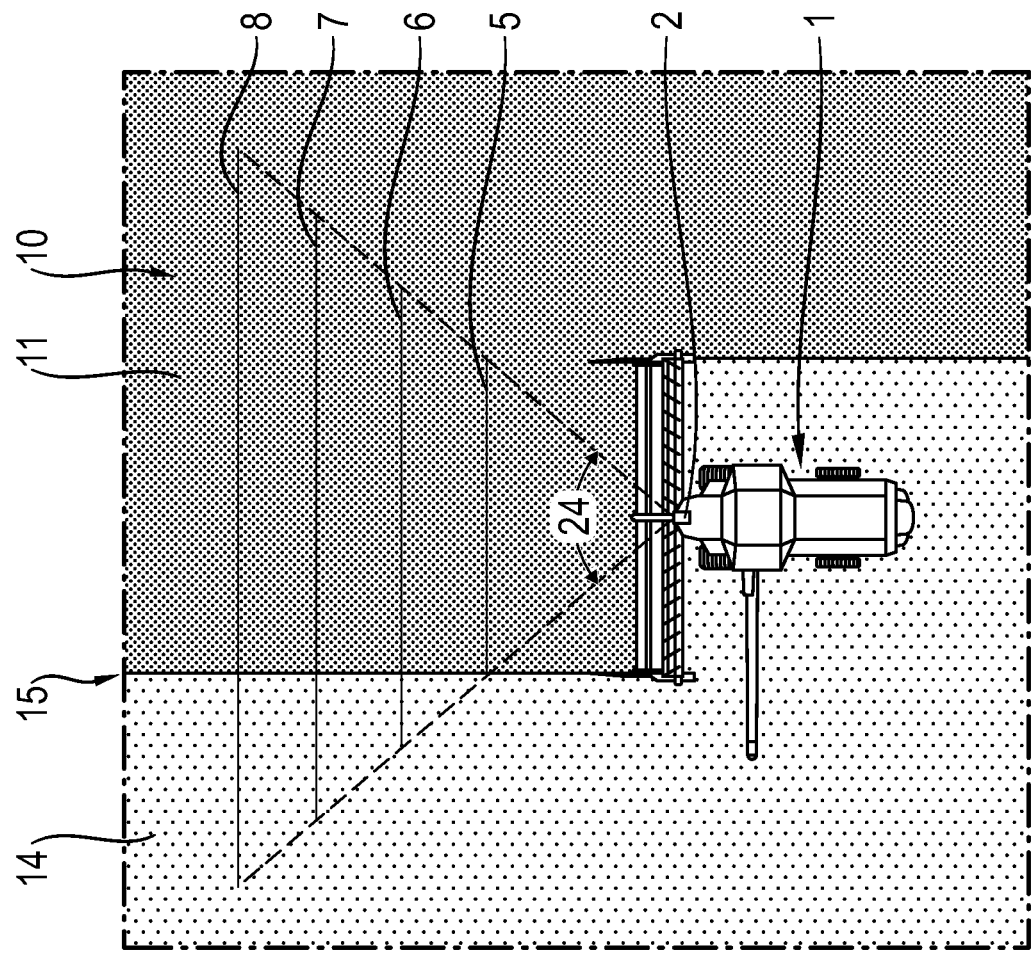
FIG. 2 a self-propelled agricultural work machine with a rangefinder in a top view.

FIG. 2 shows a self-propelled agricultural work machine 1 with a rangefinder 2. The rangefinder 2 emits measurement signals 5, 6, 7, 8 with different vertical angles (not shown). As a result of the different vertical angles, the measurement signals 5, 6, 7, 8 impinge on the field 10 at different distances in front of the work machine 1. During a measurement, every measurement signal is emitted multiple times with a different horizontal angle 24. Some of the measurement signals 5, 6, 7, 8 are reflected by the crop 11 and some of the measurement signals 5, 6, 7, 8 are reflected by the stubble field 14 that has already been harvested. The crop edge 15 can be acquired from the different reflections. The detected crop edge 15 can be used by a steering control, for example, to drive the work machine 1 along the crop edge 15. The steering control can run on the same computing unit on which the measurement points are evaluated or on another computing unit.

Figure 3:
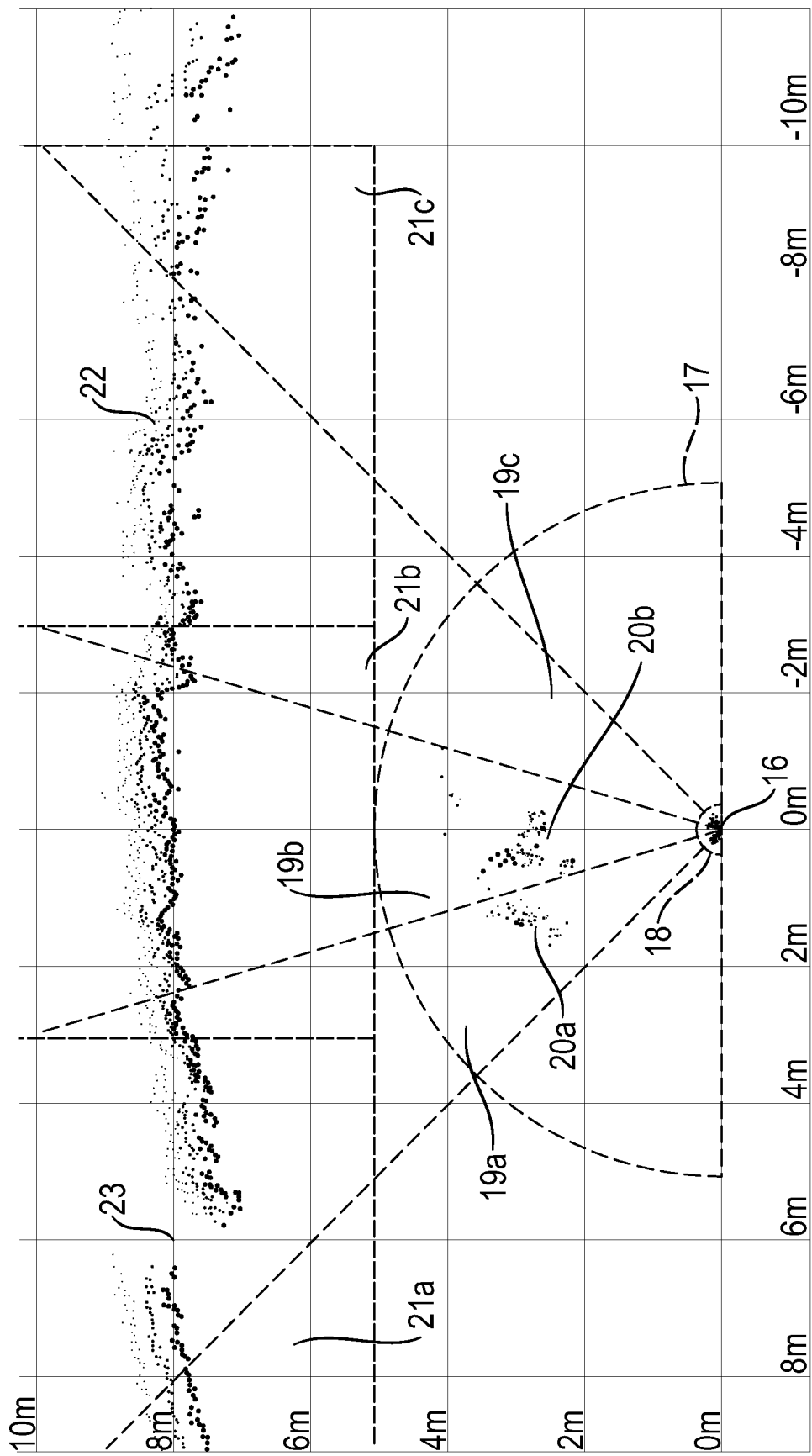
FIG. 3 measurement points of a measurement.

FIG. 3 shows the measurement points of a measurement. The distance of the measurement points and the horizontal angle thereof are shown proceeding from a sensor point. Measurement points below the first limiting value 17 are identified as interfering signals. In this example, the first limiting value 17 amounts to five meters. The interfering signals are differentiated into dust signals and dirt signals based on a second limiting value 18. The second limiting value 18 amounts to forty centimeters in this example. The interfering signals are associated with three angular areas 19a, 19b, 19c in this example. Some dust signals 20a are detected in the first angular area 19a. Many dust signals 20b are detected in the second angular area 19b. No dust signals are detected in the third angular area 19c. The area of the dirt signals in this view is very small and is described more fully referring to FIG. 4.

The measurement points with distances above the first limiting value 17 are identified as useful signals 22. In this example, the useful signals are associated with three measurement areas 21a, 21b, 21c. In this example, the measurement areas 21a, 21b, 21c are rectangular in a Cartesian coordinate system. The useful signals 22 are characterized in each instance by distance, horizontal angle 24 and vertical angle 9. For association with a measurement area 21a, 21b, 21c, every useful signal 22 is projected onto a plane and the measurement area 21a, 21b, 21c in which the projection falls is determined. In this example, sufficient useful signals 22 are acquired in all three measurement areas 21a, 21b, 21c. A measurement gap 23 in the useful signals 22 is detected in the first measurement area 21a. The crop edge 15 is detected at the measurement gap 23.

Figure 4:
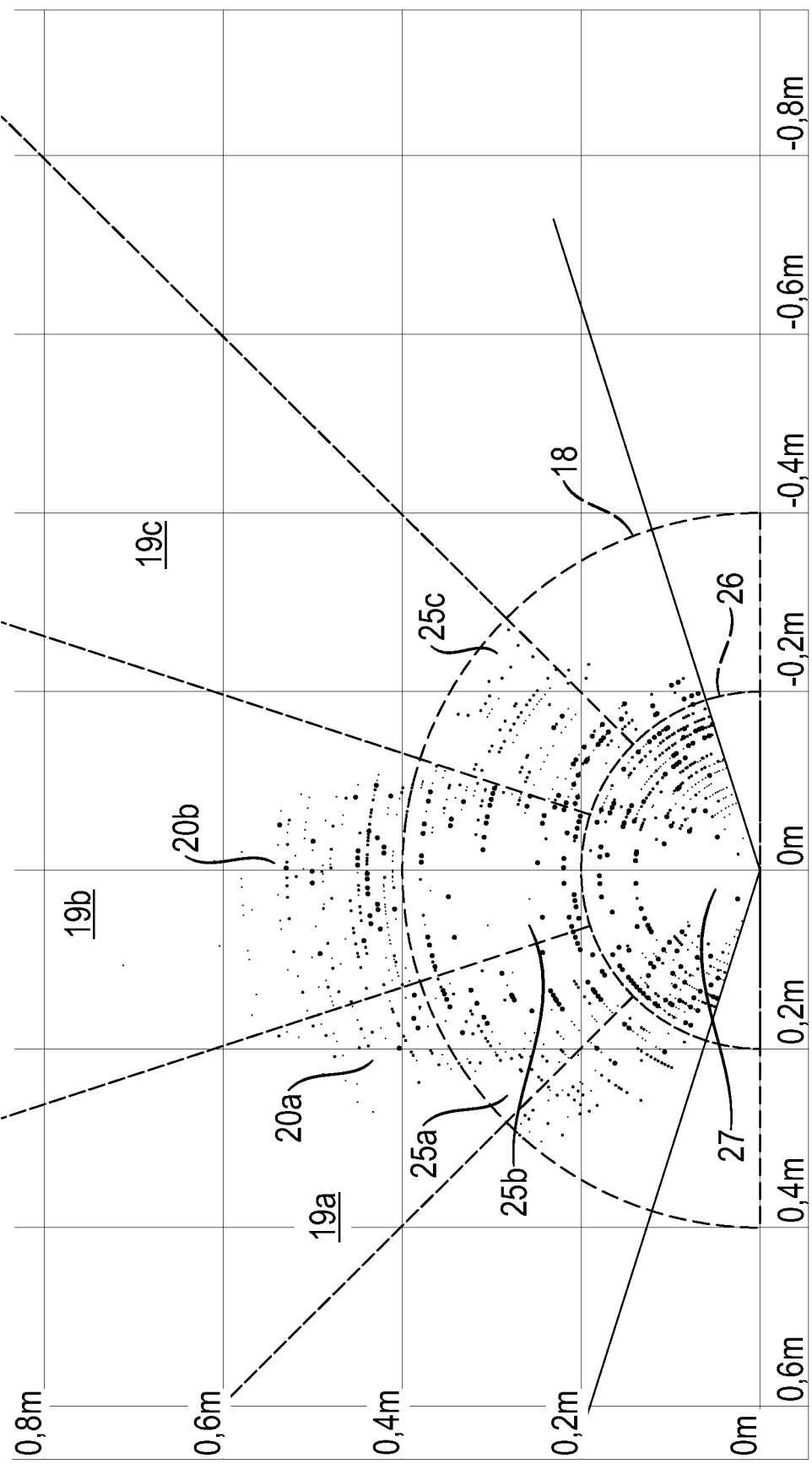
FIG. 4 measurement points of a measurement.

The measurement points of a measurement with short distances are shown in FIG. 4. In the first angular area 19a, some dust signals 20a with distances greater than the second limiting value 18 and many dirt signals 25a with distances less than the second limiting value 18 are shown. Many dust signals 20b and some dirt signals 25b are shown in the second angular area 19b. No dust signals and many dirt signals 25c are shown in the third angular area 19c. Measurement points with very short distances 27 are shown below a third limiting value 26. These measurement points 27 result from reflection of the measurement beams at the housing of the rangefinder. Since these measurement points always occur even when no dirt adheres to the housing, these measurement points are not taken into account for determining the quantity of dirt signals.

Figure 5:
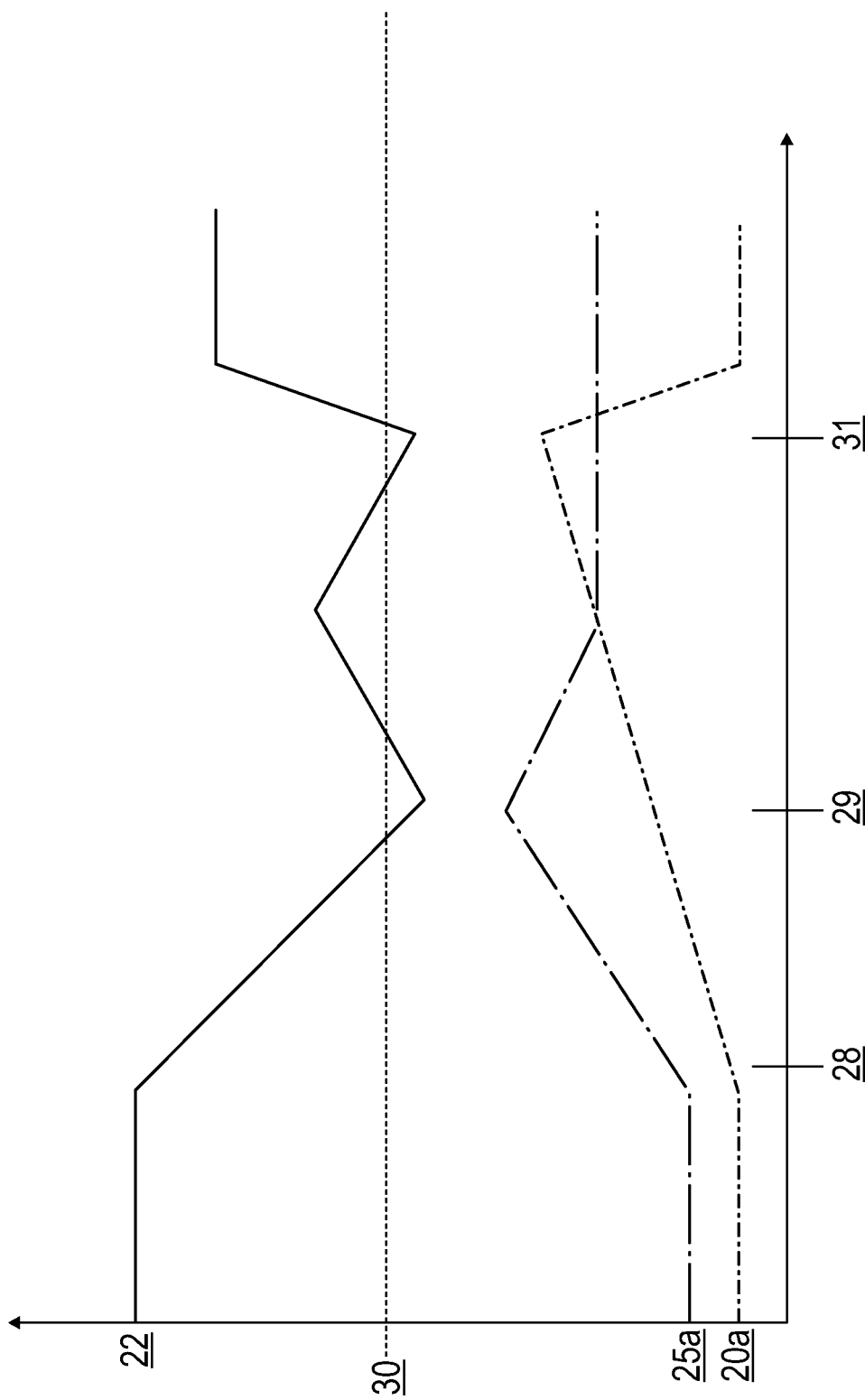
FIG. 5 quantity of measurement points over time.

FIG. 5 shows the quantity of measurement points in the first measurement area 21a and in the first angular area 20a over time. The measurement points are differentiated into useful signals 22, dust signals 20a and dirt signals 25a. At a first time 28 at the start of the time plot, the rangefinder is clean and the quantity of dirt signals 25a is small. The dust burden and the quantity of dust signals 20a are likewise small. The quantity of useful signals 22 is high. Over time, the dust burden increases, the quantity of dust signals 20a increases and the quantity of useful signals 22 decreases. At a second time 29, the quantity of useful signals 22 drops below a first threshold value 30, whereupon a warning signal is emitted and the quantity of dust signals 20*a* is compared with the quantity of dirt signals 25*a*. Since the quantity of dust signals 20*a* is greater than the quantity of dirt signals 25*a*, a signal for dust extraction is emitted. The signal for dust extraction activates a dust extraction device. As a result of the dust extraction, the quantity of dust signals 20*a* decreases and the quantity of useful signals 22 increases. Over time, some of the dust settles in front of the rangefinder as dirt, the quantity of dirt signals 25*a* increases and the quantity of useful signals 22 decreases. At a third time 31, the quantity of useful signals 22 falls below the first threshold value 30, whereupon a warning signal is emitted and the quantity of dust signals 20*a* is compared with the quantity of dirt signals 25*a*. Since the quantity of dirt signals 25*a* is greater than the quantity of dust signals 20*a*, a signal for cleaning is emitted. The signal for cleaning activates a cleaning system. As a result of the cleaning, the quantity of dirt signals 20*a* decreases and the quantity of useful signals 22 increases.

Figure 6:
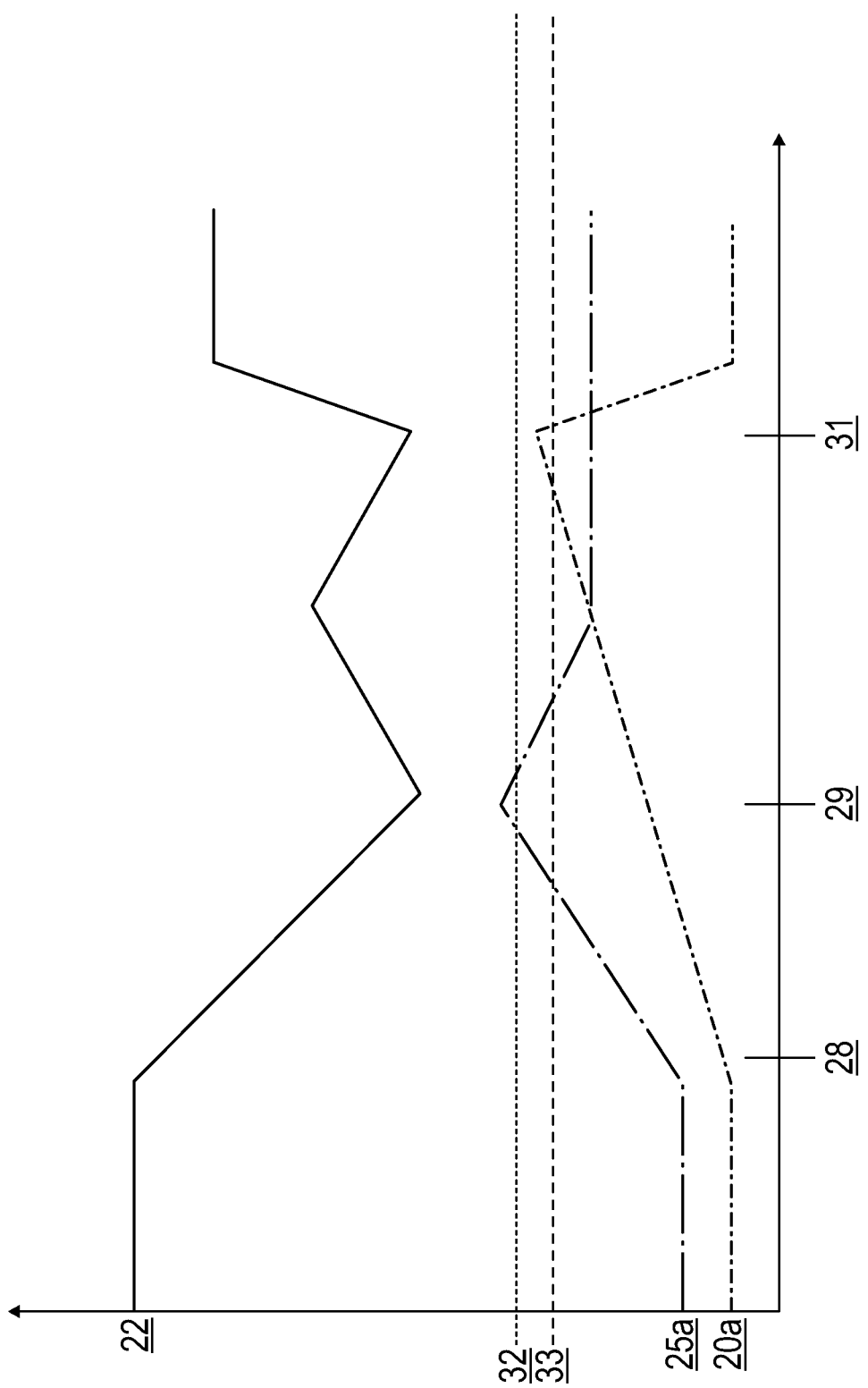
FIG. 6 quantity of measurement points over time.

FIG. 6 shows the quantity of measurement points in the first measurement area 21*a* and in the first angular area 20*a* over time. The measurement points are differentiated into useful signals 22, dust signals 20*a* and dirt signals 25*a*. At a first time 28 at the start of the time plot, the rangefinder is clean and the quantity of dirt signals 25*a* is small. The dust burden and the quantity of dust signals 20*a* are likewise small. The quantity of useful signals 22 is high. Over time, the dust burden increases, the quantity of dust signals 20*a* increases and the quantity of useful signals 22 decreases. At a second time 29, the quantity of dust signals 20*a* rises above a second threshold value 32, whereupon a signal for dust extraction is emitted. The signal for dust extraction activates a dust extraction device. As a result of the dust extraction, the quantity of dust signals 20*a* decreases and the quantity of useful signals 22 increases. Over time, some of the dust settles in front of the rangefinder as dirt, the quantity of dirt signals 25*a* increases and the quantity of useful signals 22 decreases. At a third time 31, the quantity of dirt signals 25*a* rises above a third threshold value 33, whereupon a signal for cleaning is emitted. The signal for cleaning activates a cleaning system. As a result of the cleaning, the quantity of dirt signals 20*a* decreases and the quantity of useful signals 22 increases.

The quantity of dust signals and dirt signals can also be determined over all of the angular areas instead of only for the first measurement area. In this case, the signal for dust extraction is emitted when the quantity of all dust signals 20*a*, 20*b* rises above a fourth threshold value 32. Analogously, the signal for cleaning is emitted when the quantity of all dirt signals 25*a*, 25*b*, 25*c* rises above a fifth limiting value. The time flow is analogous to the flow shown in FIG. 6 except that, instead of the interfering signals of the first angular area, all of the interfering signals are taken into account and the threshold values are adjusted.

REFERENCE CHARACTERS

1 work machine
2 rangefinder
3 roof
4 driver's cab
5 first measurement signal
6 second measurement signal
7 third measurement signal
8 fourth measurement signal
9 vertical angle
10 field
11 crop
12 first limiting value
13 obstacle
14 stubble field
15 crop edge
16 sensor point
17 first limiting value
18 second limiting value
19*a* first angular area
19*b* second angular area
19*c* third angular area
20*a* dust signals
20*b* dust signals
21*a* first measurement area
21*b* second measurement area
21*c* third measurement area
22 useful signals
23 measurement gap
24 horizontal angle
25*a* dirt signals
25*b* dirt signals
25*c* dirt signals
26 fourth limiting value
27 measurement points with very short distance
28 first time
29 second time
30 first threshold value
31 third time
32 second/fourth threshold value
33 third/fifth threshold value

What is claimed is:

1. A method for evaluation of signals of a rangefinder, particularly of a laser rangefinder, wherein the rangefinder has at least one sensor point, comprising;
   carrying out measurements cyclically with the rangefinder by
      emitting with the rangefinder a plurality of measurement points for each measurement, wherein each one of the measurement points indicates a distance from the sensor point, and
      measuring distances in a plurality of directions with the rangefinder, wherein a horizontal angle is associated with each one of the measurement points,
   differentiating a plurality of the measurement points into useful signals and interfering signals based on the distance of each measuring point from the sensor point, wherein the measurement points with a distance below a first limiting value are identified as interfering signals, and the measurement points above the first limiting value are identified as useful signals, wherein the useful signals are associated with a first measurement area when the useful signals satisfy a predetermined condition for distance and horizontal angle,
   determining a quantity of the useful signals in the first measurement area and comparing the quantity with a first threshold value, and
   emitting a warning signal when the quantity of useful signals lies below the first threshold value.

2. The method according to claim 1, wherein the interfering signals are differentiated into dust signals and dirt signals, wherein the interfering signals with a distance below a second limiting value are identified as dirt signals, and the interfering signals above the second limiting value are identified as dust signals.

3. The method according to claim 2, wherein the useful signals are associated with a plurality of measurement areas, wherein the association of the useful signals with measurement areas takes into account the horizontal angle and the distance of the useful signals.

4. The method according to claim 3, wherein a vertical angle is associated with each one of the measurement points, and wherein the association of the useful signals with the measurement areas takes the vertical angle into account.

5. The method according to claim 4, wherein a position comprising distance, horizontal angle and vertical angle is converted into a Cartesian coordinate system for each useful signal, wherein the position in the Cartesian coordinate system is projected on a plane and the first measurement area in the plane is rectangular.

6. The method according to claim 5, wherein a straight line defined by vertical angle, horizontal angle and sensor point is calculated for a first interfering signal, and the first interfering signal is associated with the first measurement area when the straight line intersects the plane within the first measurement area.

7. The method according claim 3, wherein the interfering signals are associated with a plurality of angular areas, wherein the association of the interfering signals with the angular areas takes into account the horizontal angle of the interfering signals.

8. The method according to claim 7, wherein the association of the dust signals with the angular areas and/or the association of the dirt signals with the angular areas takes into account a vertical angle associated with each one of the measuring points.

9. The method according to claim 7, wherein one of the angular areas is associated with every measurement area.

10. The method according to claim 7, wherein when the quantity of useful signals in the first measurement area for a measurement lies below the first threshold value, a quantity of dust signals and a quantity of dirt signals of the measurement in the associated angular area are compared, wherein a signal for dust extraction is emitted when the quantity of dust signals is higher than the quantity of dirt signals, and a signal for cleaning is emitted when the quantity of dirt signals is higher than the quantity of dust signals.

11. The method according to claim 10, wherein the signal for dust extraction is emitted when the quantity of dust signals is higher than a second threshold value.

12. The method according to claim 11, wherein the signal for cleaning is emitted when the quantity of dirt signals is higher than a third threshold value.

13. The method according to claim 12, wherein the signal for dust extraction is emitted when the quantity of dust signals in an angular area is higher than a fourth threshold value.

14. The method according to claim 13, wherein dirt signals having a distance of less than a fourth limiting value are disregarded when determining the quantity of dirt signals, wherein the fourth threshold value is greater than ten centimeters.

15. The method according to claim 12, wherein the signal for cleaning is emitted when the quantity of dirt signals in an angular area is higher than a fifth threshold value.

16. The method according to claim 1, wherein useful signals above a third limiting value are disregarded when determining the quantity of useful signals.

17. The method according to claim 1, wherein the first threshold value is less than one half of the quantity of measurement points of the measurement.

18. The method according to claim 1, wherein the first threshold value is less than one third of the quantity of measurement points of the measurement.

19. A system for signal evaluation with a rangefinder and a computing unit, wherein the rangefinder is communicatively coupled with the computing unit, and wherein the computing unit is provided and configured to implement the method according to claim 1.

20. The system according to claim 19, wherein the rangefinder is attached to a self-propelled agricultural work machine.

* * * * *